(12) United States Patent
Chen et al.

(10) Patent No.: US 8,233,294 B2
(45) Date of Patent: Jul. 31, 2012

(54) METHOD AND SYSTEM FOR CONTROLLING A POWER CONVERTER SYSTEM CONNECTED TO A DC-BUS CAPACITOR

(75) Inventors: Chingchi Chen, Ann Arbor, MI (US); Michael W. Degner, Novi, MI (US); Satish Thuta, San Jose, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 32 days.

(21) Appl. No.: 12/861,004

(22) Filed: Aug. 23, 2010

(65) Prior Publication Data

US 2011/0164443 A1   Jul. 7, 2011

(51) Int. Cl.
*H02M 1/12*   (2006.01)
*H02M 7/44*   (2006.01)

(52) U.S. Cl. ............................. 363/40; 363/98

(58) Field of Classification Search .......... 363/97, 363/98, 131, 132, 39, 40, 41
See application file for complete search history.

(56) References Cited

U.S. PATENT DOCUMENTS

| | | | |
|---|---|---|---|
| 4,990,844 A * | 2/1991 | Gritter et al. ............... | 318/762 |
| 6,023,417 A | 2/2000 | Hava et al. | |
| 6,154,379 A * | 11/2000 | Okita ............................ | 363/40 |
| 6,307,759 B1 * | 10/2001 | Inarida et al. ................. | 363/37 |
| 6,392,905 B1 | 5/2002 | Huang et al. | |
| 6,751,105 B2 * | 6/2004 | Yamanaka et al. ............ | 363/41 |
| 7,593,243 B2 * | 9/2009 | Ganev et al. .................. | 363/44 |
| 2005/0270806 A1 | 12/2005 | Zhu | |
| 2007/0080659 A1 | 4/2007 | Urakabe et al. | |
| 2008/0084716 A1 | 4/2008 | Ganev et al. | |
| 2009/0027933 A1 | 1/2009 | Kajouke et al. | |

OTHER PUBLICATIONS

Hava, Ahmet M., et al., A High Performance Generalized Discontinuous PWM Algorithm, IEEE Applied Power Electronics Conference, Feb. 1997, pp. 886-891, vol. 2, Atlanta, Georgia, Feb. 1997.
Ojo, Olorunfemi, et al., The Generalized Discontinuous PWM Modulation Scheme for Three-Phase Voltage Source Inverters, pp. 1-8, Cookeville, TN.
Gowri, K. Sri, et al., Novel Space Vector Based Generalized Discontinuous PWM Algorithm for INduction Motor Drives, ARPN Journal of Engineering and Applied Sciences, Feb. 2009, pp. 76-88, vol. 4, No. 1, India.

* cited by examiner

*Primary Examiner* — Gary L Laxton
(74) *Attorney, Agent, or Firm* — David B. Kelley; Brooks Kushman P.C.

(57) ABSTRACT

A method and system for controlling a power converter system with first, second, and third phase legs with respective first, second, and third associated phase currents determine direction of current flow in at least two phase legs and switch states of the power converter system in response to the current flow directions to reduce ripple current in a connected direct current (DC)-bus capacitor.

20 Claims, 5 Drawing Sheets

METHOD AND SYSTEM FOR CONTROLLING A POWER CONVERTER SYSTEM CONNECTED TO A DC-BUS CAPACITOR

BACKGROUND

1. Technical Field

The present invention generally relates to controlling power converter systems.

2. Background Art

The need or desire to reduce ripple current in a power conversion system is well known. A high ripple current can increase the temperature of the components connected to a direct current (DC)-bus as well as increase an amount of electromagnetic interference generated by the power conversion system. Furthermore, a high ripple current can degrade the operation or life of components in the power conversion system as well as decrease the durability or performance of the power conversion system.

A capacitor used to reduce ripple current in a power conversion system can be a relatively expensive component. Larger capacitors are often used as the expected level of ripple current flowing through the DC bus increases. However, the expense of the capacitor increases as the size of the capacitor increases. Thus, it may be desirable to reduce the expected ripple current in the power conversion system which allows the power conversion system to use a smaller DC-bus capacitor. The smaller DC-bus capacitor can reduce the weight, size, and volume of the power conversion system.

SUMMARY

Various embodiments of a system or method for controlling a power converter system with first, second, and third phase legs connected to a direct current (DC)-bus capacitor determine direction of current flow in at least two of the phase leg currents and control switching states of the power converter system in response to the current flow directions to reduce ripple current in the DC-bus capacitor.

DETAILED DESCRIPTION

Embodiments of the present disclosure generally provide a method and system for controlling a power converter system with a direct current (DC)-bus capacitor. In operation, the power converter system is controlled to reduce ripple current flowing through the DC-bus capacitor. As those of ordinary skill in the art will understand, various features of the embodiments illustrated and described with reference to any one of the Figures may be combined with features illustrated in one or more other Figures to produce alternative embodiments that are not explicitly illustrated or described. The combinations of features illustrated provide representative embodiments for typical applications. However, various combinations and modifications of the features consistent with the teachings of the present disclosure may be desired for particular applications or implementations.

Figures 1, 2:
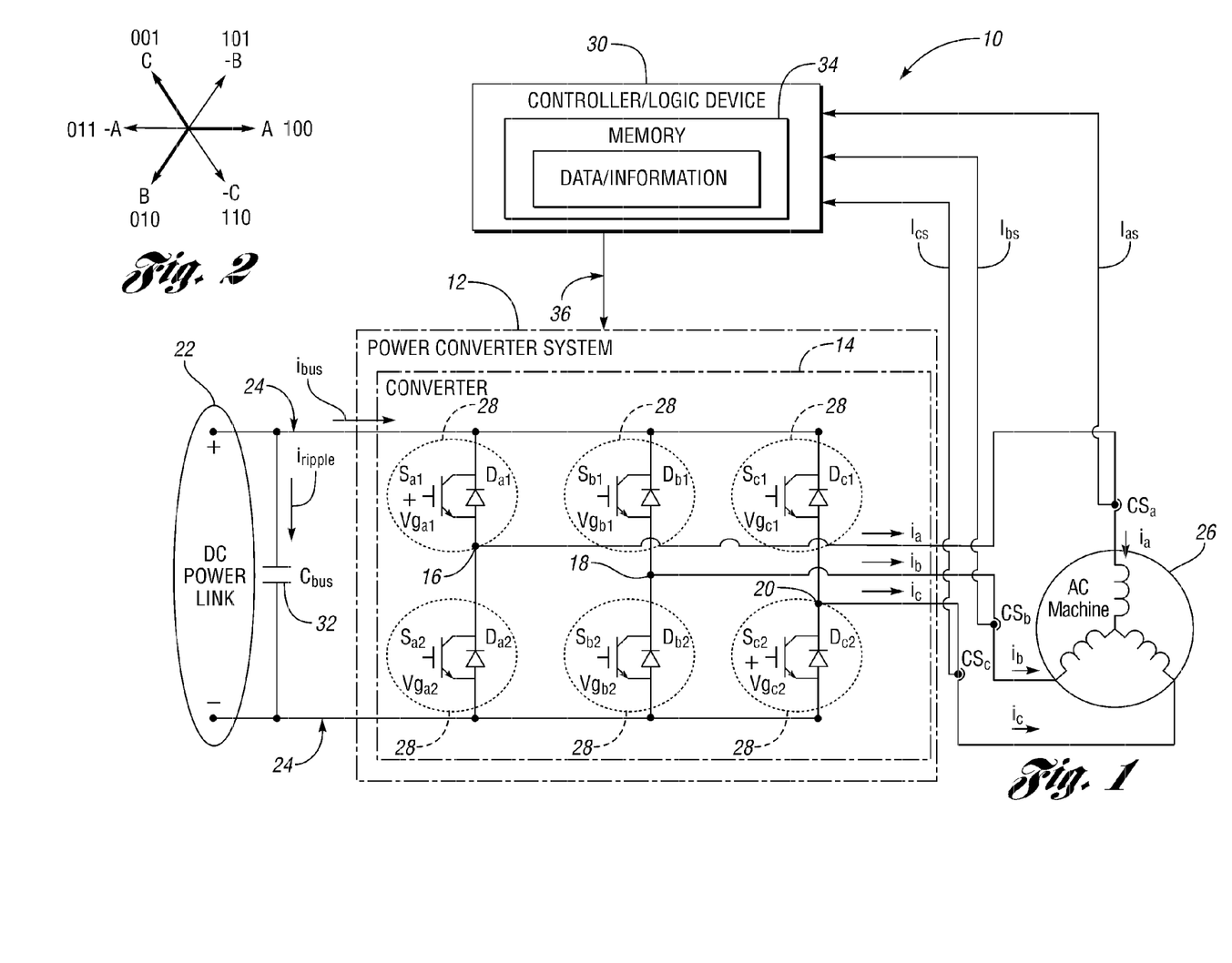
FIG. 1 is a schematic diagram illustrating a system for controlling a power converter system with first, second, and third phase legs connected to a direct current (DC)-bus capacitor in accordance with one embodiment.
FIG. 2 is a vector diagram illustrating active states of a three-phase converter in the power converter system in accordance with one embodiment.

With reference to FIG. 1, a system 10 is provided for controlling a power converter system 12. The power converter system 12 of FIG. 1 is shown to include a converter 14 with first, second, and third phase legs 16, 18, 20. While the converter 14 is shown as a three-phase converter, the converter 14 may include additional phase legs. For example, the converter 14 may be a four-phase converter, a five-phase converter, a six-phase converter, etc. In addition, the power converter system 12 may include multiple converters with each converter 14 in the converter system 12 including three or more phase legs. For example, the system 10 may control two or more converters 14 in the power converter system 12.

The converter 14 of FIG. 1 is shown as a drive system inverter. However, the converter 14 may be any type of converter with at least the first, second, and third phase legs 16, 18, 20. The first, second, and third phase legs 16, 18, 20 have respective first, second, and third associated phase currents, such as phase currents $i_a$, $i_b$, and $i_c$ as illustrated in FIG. 1.

As shown in FIG. 1, the converter 14 may be a DC-to-AC converter. In operation, the DC-to-AC converter receives DC power from a DC power link 22 through a DC bus 24 and converts the DC power to AC power. The AC power is transmitted via the phase currents $i_a$, $i_b$, and $i_c$ to drive an AC machine 26, such as a three-phase permanent-magnet synchronous motor (PMSM) as depicted in FIG. 1. In such an example, the DC power link 22 may include a DC storage battery to provide DC power to the DC bus 24. In another example, the converter 14 may operate as an AC-to-DC converter that converts AC power from the AC machine 26 (e.g., generator) to DC power, which the DC bus 24 can provide to the DC power link 22. Furthermore, the system 10 may control the power converter system 12 in other power electronic topologies.

With continuing reference to FIG. 1, each of the phase legs 16, 18, 20 in the converter 14 includes power switches 28, which may be implemented by various types of controllable switches. In one embodiment, each power switch 28 may include a diode and a transistor, such as an IGBT, for example. The diodes of FIG. 1 are labeled $D_{a1}$, $D_{a2}$, $D_{b1}$, $D_{b2}$, $D_{c1}$, and $D_{c2}$ while the IGBTs of FIG. 1 are respectively labeled $S_{a1}$, $S_{a2}$, $S_{b1}$, $S_{b2}$, $S_{c1}$, and $S_{c2}$. The power switches with $S_{a1}$, $S_{a2}$, $D_{a1}$, and $D_{a2}$ are part of phase leg A of the three-phase converter, which is labeled as the first phase leg 16 in FIG. 1. Similarly, the power switches with $S_{b1}$, $S_{b2}$, $D_{b1}$, and $D_{b2}$ are part of phase leg B and the power switches with $S_{c1}$, $S_{c2}$, $D_{c1}$, and $D_{c2}$ are part of phase leg C of the three-phase converter. The converter 14 may include any number of the power switches 28 or circuit elements depending on the particular configuration of the converter 14.

As illustrated in FIG. 1, current sensors $CS_a$, $CS_b$, and $CS_c$ are provided to sense current flow in the respective phase legs 16, 18, 20. FIG. 1 shows the current sensors $CS_a$, $CS_b$, and $CS_c$ separate from the power converter system 12. However, current sensors $CS_a$, $CS_b$, and $CS_c$ may be integrated as part of the power converter system 12 depending on its configuration. Current sensors $CS_a$, $CS_b$, and $CS_c$ of FIG. 1 are installed in series with each of phase legs A, B and C (i.e., phase legs 16, 18, 20 in FIG. 1) and provide the respective feedback signals $i_{as}$, $i_{bs}$, and $i_{cs}$ (also illustrated in FIG. 1) for the system 10. The feedback signals $i_{as}$, $i_{bs}$, and $i_{cs}$ may be raw current signals processed by logic device (LD) 30 or may be embedded or encoded with data or information about the current flow through the respective phase legs 16, 18, 20. In operation, the feedback data/signals represented by $i_{as}$, $i_{bs}$, and $i_{cs}$ can indicate a direction of current flow, a magnitude of current flow, or both a direction and magnitude of current flow through the respective phase legs A, B, and C.

Referring again to FIG. 1, the system 10 includes a logic device (LD) or controller 30. The controller or LD 30 can be implemented by various types or combinations of electronic devices and/or microprocessor-based computers or controllers. To implement a method of controlling the power converter system 12, the controller 30 may execute a computer program or algorithm embedded or encoded with the method and stored in volatile and/or persistent memory 34. Alternatively, logic may be encoded in a logic or gate array stored on one or more integrated circuit chips. As shown in the embodiment of FIG. 1, the controller 30 receives and processes the feedback signals $i_{as}$, $i_{bs}$, and $i_{cs}$ to control the phase currents $i_a$, $i_b$, and $i_c$ such that the phase currents $i_a$, $i_b$, and $i_c$ flow through the phase legs 16, 18, 20 and into the respective winding of the AC machine 26 according to various current or voltage patterns. For example, current patterns can include patterns of phase currents $i_a$, $i_b$, and $i_c$ flowing into and away from the DC-bus 24 or a DC-bus capacitor 32. The DC-bus capacitor 32 of FIG. 1 is shown separate from the power converter system 12. However, the DC-bus capacitor 32 may be integrated as part of the power converter system 12.

As shown in FIG. 1, a storage medium 34 (hereinafter "memory"), such as computer-readable memory may store the computer program or algorithm embedded or encoded with the method. In addition, the memory 34 may store data or information about the various operating conditions or components in the power converter system 12. For example, the memory 34 may store data or information about current flow through the respective phase legs 16, 18, 20. The memory 34 can be part of the controller 30 as shown in FIG. 1. However, the memory 34 may be positioned in any suitable location accessible by the controller 30.

As illustrated in FIG. 1, the controller 30 transmits at least one control signal 36 to the power converter system 12. The power converter system 12 receives the control signal 36 to control the switching configuration of the converter 14 and therefore the current flow through the respective phase legs 16, 18, and 20. The switching configuration is a set of switching states of the power switches 28 in the converter 14. In general, the switching configuration of the converter 14 determines how the converter 14 converts power between the DC power link 22 and the AC machine 26.

To control the switching configuration of the converter 14, the converter 14 changes the switching state of each power switch 28 in the converter 14 to either an ON state or an OFF state based on the control signal 36. In the illustrated embodiment, to switch the power switch 28 to either ON or OFF states, the converter 14 controls the gate voltage ($V_g$) applied to each power switch 28 and therefore the switching state of each power switch 28. Gate voltages $Vg_{a1}$, $Vg_{a2}$, $Vg_{b1}$, $Vg_{b2}$, $Vg_{c1}$, and $Vg_{c2}$ (shown in FIG. 1) control the switching state of the respective power switches 28. While the converter 14 is shown as a voltage-driven device in FIG. 1, the converter 14 may be a current-driven device or controlled by other strategies that switch the power switch 28 between ON and OFF states.

As also shown in FIG. 1, each phase leg 16, 18, and 20 includes two switches 28. However, only one switch in each of the legs 16, 18, 20 can be in the ON state without shorting the DC power link 22. Thus, in each phase leg, the switching state of the lower switch is typically opposite the switching state of the corresponding upper switch. Consequently, a HIGH state of a phase leg refers to the upper switch in the leg in the ON state with the lower switch in the OFF state. Likewise, a LOW state of the phase leg refers to the upper switch in the leg in the OFF state with the lower switch in the ON state.

Changing the switching states of one or more of the power switches 28 in the converter 14 can change the switching configuration of the converter 14 and therefore how the converter 14 converts power between the DC power link 22 and the AC machine 26. For example, if the converter 14 is a three-phase converter, then switching configurations of the converter 14 include <000>, <100>, <110>, <010>, <011>, <001>, <101>, and <111> where <000> and <111> are reactive (or null) states of the converter 14, while the other states (i.e., <100>, <110>, <010>, <011>, <001>, and <101>) are active states of the converter 14.

Two situations can occur during an active state of the three-phase converter example illustrated in FIG. 1: (1) two phase legs are in the HIGH state while the third phase leg is in the LOW state, or (2) one phase leg is in the HIGH state while the other two phase legs are in the LOW state. Thus, one phase leg in the three-phase converter, which may be defined as the "reference" phase for a specific active state of the converter 14, is in a state opposite to the other two phase legs, or "non-reference" phases, that have the same state. Consequently, the non-reference phases are either both in the HIGH state or both in the LOW state during an active state of the converter 14.

As shown in FIG. 2, the active states of the three-phase converter of FIG. 1 can be plotted as a vector diagram. The vector diagram of FIG. 2 has three phase axes that are spaced apart 120 degrees relative to each other. When a phase leg in the converter 14 is in a HIGH state, that phase leg is represented as a vector or positive arrow along that specific phase axis. On the other hand, when a phase leg in the converter 14 is in the LOW state, the phase leg is represented by a negative vector or negative arrow that points in a direction opposite compared to the same phase leg in the HIGH state. The overall effective vector representing the switching configuration of the converter 14 is the vector sum of the three phase legs A, B and C. The vector diagram of FIG. 2 shows the converter 14 having six active states (i.e., <100>, <110>, <010>, <011>, <001>, and <101>). However, the converter 14 may have additional active states depending on the number of additional phase legs in the converter 14. For example, the converter 14 may be a four-phase converter that has 14 active states and two null states (e.g., <0000> and <1111>).

With continuing reference to FIG. 2, the converter has a number of adjacent states. An adjacent state refers to two states of the converter 14 with representing vectors next to or adjacent to each other. For example, states <101> and <110> are active adjacent states relative to state <100>. States <001>, <011>, and <010> are non-adjacent active states relative to state <100>. The controller 30 may employ a strategy to control the switching configuration of the converter 14 based on adjacent states of the converter 14 to facilitate reducing ripple current in the DC-bus capacitor 32.

As illustrated in FIG. 1, currents $i_a$, $i_b$, and $i_c$ circulate among the phase legs 16, 18, 20 without returning to the DC bus 24 during a reactive (or null) state of the converter 14. Thus, the net current $i_{bus}$ (shown in FIG. 1) returning to the DC bus 24 is zero when the converter 14 is in the reactive state. When the reference phase leg is in the HIGH state during an active state of the converter 14, the net current $i_{bus}$ from the converter 14 to the DC power link 22 is equal to the phase current flow of the reference phase leg. However, the net current $i_{bus}$ to the DC power link 22 is equal to the negative phase current flow (or opposite current polarity) of the reference phase leg when the reference phase leg is in the LOW state during an active state of the converter 14. The controller 30 can calculate the DC current flow returning to the DC power link 22 based on the current flow through the two non-reference phases since all phase currents sum to zero (i.e., $i_a+i_b+i_c=0$). For example, the controller 30 can calculate the DC current flow returning to the DC power link 22 as a sum of the current flow through the two non-reference phases when these two non-reference phases are in the HIGH states. Likewise, the controller 30 can calculate the DC current flow returning to the DC power link 22 as a negative sum of the current flow through the two non-reference phases when the non-reference phases are in the LOW states.

In operation, during each switching cycle, the controller 30 determines a direction of current flow in at least two of the phase legs and then controls switching states of the converter 14 in response to the directions of current flow to reduce ripple current in the DC-bus capacitor 32. The controller 30 may determine the direction of current flow in the two phase legs relative to the DC bus capacitor 32 for directional reference for the system 10. In one embodiment, the controller 30 controls the switching states of the converter 14 to reduce root-mean-squared (RMS) current flow in the DC bus 24 and thereby reduce the ripple current flow in the DC-bus capacitor 32. The controller 30 may also control switching states of the converter 14 to increase the duration of active states with current flowing in opposite directions (i.e., opposite current polarities) in the non-reference phase legs. If one or more segments in the original switching pattern have active states with current flowing in the same direction through the non-reference phase legs, then the controller 30 may control the switching patterns to shift out of this undesirable segment(s) or reduce the time the converter 14 has the undesirable segment(s). In addition, the controller 30 may control the switching patterns to not only shift out of an undesirable segment(s), but also to reduce the duration of one or more reactive (or null) states in the converter 14 and add an additional active vector adjacent to the undesirable vector in the undesirable segment(s). These strategies are explained by example in the switching diagrams of FIGS. 3-7c.

With reference to FIGS. 3-7c, switching diagrams are provided to illustrate switching states of the first, second, and third phase legs 16, 18, 20 being controlled by the controller 30. $S_A$ represents phase leg A of the converter 14. The value of $S_A$ is either "1" or "0". As shown, "1" represents phase leg A in a HIGH state where the upper switch of phase leg A is in the ON state and the lower switch is in the OFF state. Likewise, "0" represents phase leg A in a LOW state where the upper switch of phase leg A is in the OFF state and the lower switch is in the ON state. Similarly, $S_B$ and $S_C$ represent respective phase legs B and C of the converter 14 with values of either "1" or "0". Like phase leg A, "1" represents a HIGH state in phase leg B while "0" represents a LOW state in phase leg "B." Similarly, "1" represents a HIGH state in phase leg C while "0" represents a LOW state in phase leg C. Symbol "T" (shown in FIGS. 3-7a) represents a switching cycle or period that the controller 30 determines a desired voltage pattern for the power converter system 12. For example, the switching cycle may be 100 micro-seconds. Likewise, symbol "2T" represents two switching cycles or periods.

Figure 3:
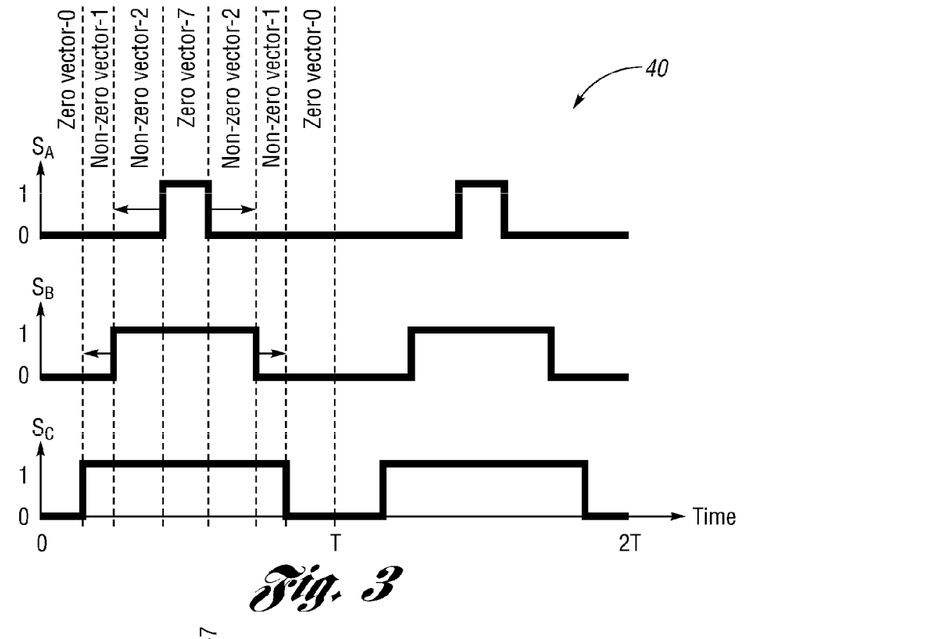
FIG. 3 is a switching diagram illustrating switching states of the first, second, and third phase legs versus time according to a continuous pulse width modulation (CPWM) scheme in accordance with one embodiment.

Referring to FIG. 3, a first switching diagram 40 is provided to illustrate switching states of the phase legs A, B, and C versus time according to a continuous pulse width modulation (CPWM) scheme. The first switching diagram 40 shows a pattern of different switching configurations of the converter 14. The pattern illustrated in the first switching diagram 40 includes three reactive (or null) states during the switching cycle T. The three reactive states of the converter 14 in FIG. 3 during switching cycle T are <000>, <111> and <000>, which are respectively labeled "Zero vector-0", "Zero vector-7" and "Zero vector-0". The active states of the converter 14 during switching cycle T include <001> and <011>, which are respectively labeled "Non-zero vector-1" and "Non-zero vector-2". When the converter 14 is in state <001>, the net current $i_{bus}$ (shown in FIG. 1) returning to the DC bus 24 is equal to phase current $+i_c$. Furthermore, when the converter 14 is in state <011>, the current $i_{bus}$ is equal to phase current $-i_a$ (phase current $i_a$ with opposite polarity). Note, states <001> and <011> of the converter 14 are adjacent to each other as illustrated in FIG. 2.

Figure 4:
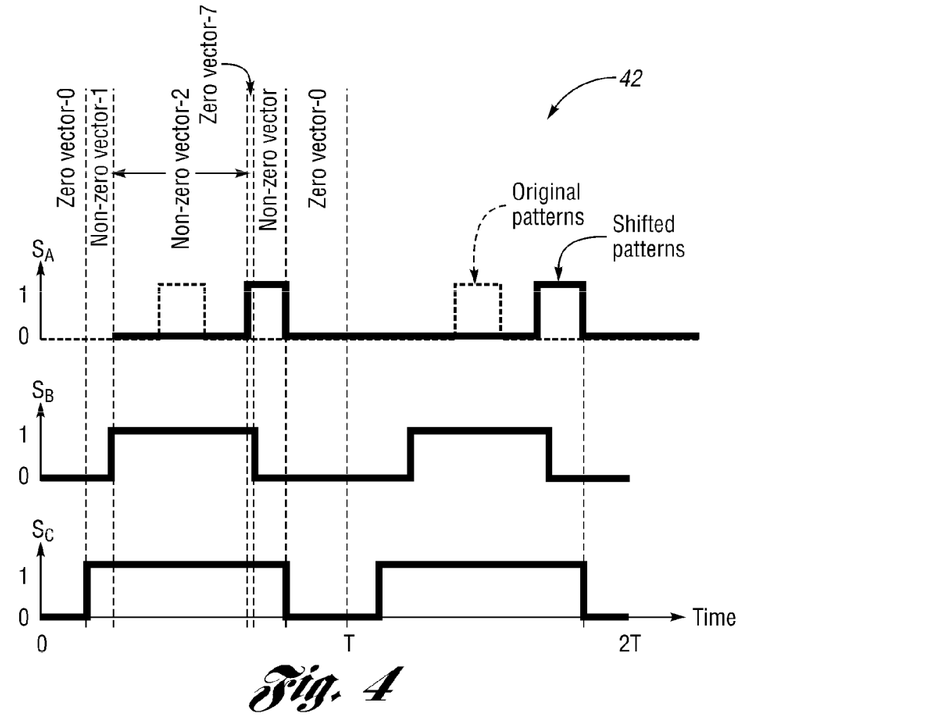
FIG. 4 is a switching diagram similar to FIG. 3, but showing switching states of phase leg A being modified when the phase currents of at least two phase legs flow in the same direction in accordance with one embodiment.

With reference to FIGS. 3 and 4, in an effort to reduce the overall RMS current flow to the DC bus 24 (or the ripple current to the DC-bus capacitor 32) and assuming state <001> is the undesirable state in the undesirable segment(s) where phase legs A and B are currents of the same polarity (i.e., phase legs A and B have current flow in the same direction), the controller 30 reduces the duration of the RMS current flow by swapping an active vector associated with the undesirable state with a different active vector that is adjacent to this undesirable vector, which may also reduce the duration of one or more reactive vectors in the converter 14.

With reference to FIG. 2, the vectors adjacent to <001> are <011> and <101>. However, vector <011> (labeled as "Non-zero vector-2") is in the original switching pattern of FIG. 3. Therefore, the controller 30 selects vector <101> to be the active vector for the shift pattern, as second switching diagram 42 illustrates in FIG. 4.

The controller 30 controls the switching states of the converter 14 to shift the switching pattern $S_a$, or waveform $S_a$, either right or left from the original $S_a$ pattern, to reduce the length of vector <001> while creating the desired substituting vector <101>. The $S_A$ waveform labeled "original pattern" in the second switching diagram 42 corresponds to the $S_A$ waveform in the first switching diagram 40 of FIG. 3. The controller 30 can control the switching states of phase legs A, B, and C over the switching cycle T to shift the $S_A$ waveform labeled "original pattern" to the $S_A$ waveform labeled "shifted pattern." Furthermore, FIG. 4 shows the example where $S_a$ is shifted to the right, which reduces the duration of the original undesirable vector <001> as well as reduces the duration of the original reactive vector <111>.

When the controller 30 modifies the switching states of phase leg A, the controller 30 may align, as illustrated in FIG. 4 for example, a HIGH state of phase leg A with respective LOW and HIGH states of phase legs B and C to reduce the duration of null states in the power converter system 12. The second switching diagram 42 (FIG. 4) also shows a shorter duration of null states in the power converter system 12 than the first switching diagram 40 (FIG. 3). Thus, the duration of null states in the power converter system 12 is reduced over a given time, such as the switching cycle T, when the controller 30 shifts the $S_A$ waveform of FIG. 4 labeled "original pattern" to the $S_A$ waveform of FIG. 4 labeled "shifted pattern". Furthermore, ripple current in the DC-bus capacitor 32 is reduced when the phase currents of two non-reference phase legs in the converter 14 flow in opposite directions.

Figure 5:
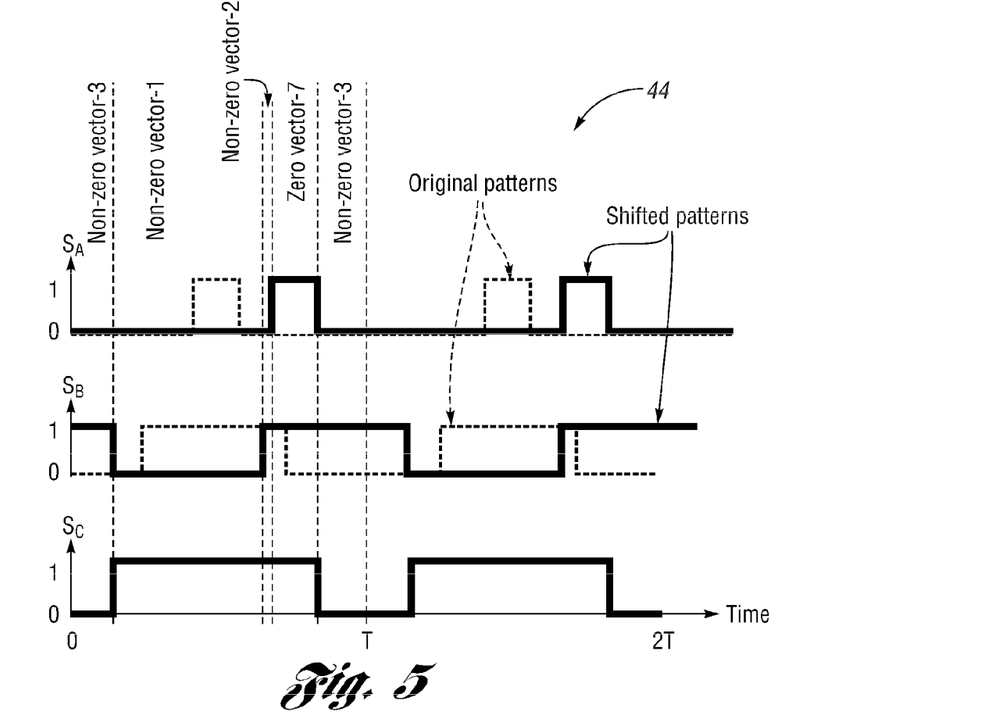
FIG. 5 is a switching diagram similar to FIG. 3, but showing switching states of phase legs A and B being modified when the phase currents of at least two phase legs flow in the same direction in accordance with one embodiment.

With reference to FIGS. 3 and 5, assuming the undesirable vector in the first switching diagram 40 is <011> (labeled "Non-zero vector-2" in FIG. 3) and phase legs B and C are currents of the same polarity (i.e., phase legs B and C have current flow in the same direction), the controller 30 reduces the duration of vector <011> by shifting the original switching pattern shown in the first switching diagram 40 of FIG. 3 to a third switching diagram 44, such as the exemplary switching diagram illustrated in FIG. 5. The controller 30 may create another active vector adjacent to the undesirable vector <011> to reduce the duration of vector <011> as well as to reduce the duration of one or more reactive vectors.

With reference to FIG. 2, the vectors adjacent to vector <011> are vectors <001> and <010>. However, vector <001> (labeled as "Non-zero vector-1") is in the original switching pattern of FIG. 3. Therefore, the controller 30 selects vector <010> to be the active vector for the shift pattern. The controller 30 controls switching states of the converter 14 to shift the switching pattern of $S_b$ to the right or left from the original position to reduce the length of vector <011> while creating the desired substituting vector <010> and reducing the duration of the reactive vector <000> (labeled as "Zero vector-0" in FIG. 3). However, the controller 30 modifies the switching pattern of $S_a$, so that the original reactive vector <111> (labeled as "Zero vector-7") is maintained without generating yet another active vector.

As shown in FIG. 5, the third switching diagram 44 shows switching states of phase legs A and B being modified when the phase currents of the two non-reference phase legs (i.e., phase legs B and C) in the converter 14 flow in the same direction. The $S_A$ and $S_B$ waveforms labeled "original patterns" in the third switching diagram 44 correspond to the respective $S_A$ and $S_B$ waveforms in the first switching diagram 40 illustrated in FIG. 3. In operation, the controller 30 can control the switching states of phase legs A, B, and C over the switching cycle T to shift the $S_A$ and $S_B$ waveforms labeled "original patterns" to the respective $S_A$ and $S_B$ waveforms labeled "shifted patterns".

FIG. 5 shows the example where the $S_b$ waveform of first switching diagram 40 (FIG. 3) is shifted to the right. When the controller 30 modifies the switching states of phase legs A and B, the controller 30 may align, as illustrated in FIG. 5 for example, a HIGH state of phase leg B with a LOW state of phase leg C to reduce the duration of null states in the power converter system 12. The third switching diagram 44 shows a shorter duration of null states in the power converter system 12 than the first switching diagram 40. Thus, the duration of null states in the power converter system 12 is reduced over a given time, such as the switching cycle T, when the controller 30 shifts the $S_A$ and $S_B$ waveforms labeled "original patterns" to the $S_A$ and $S_B$ waveforms labeled "shifted patterns" as shown in FIG. 5. Furthermore, ripple current in the DC-bus capacitor 32 is reduced when the phase currents of two non-reference phase legs in the converter 14 flow in opposite directions.

As shown in FIGS. 4-5, the relative timing of switching patterns of phase legs A, B, and C can be changed from the switching pattern depicted in FIG. 3. A change in relative timing between phase legs A, B, and C changes the switching configurations of active and reactive states of the converter 14 and, therefore, the amount of ripple current flow to the DC bus 24. Thus, the controller 30 can change the relative timing between the phase legs A, B, and C to reduce ripple current flow through the DC-bus capacitor 32.

Figure 6:
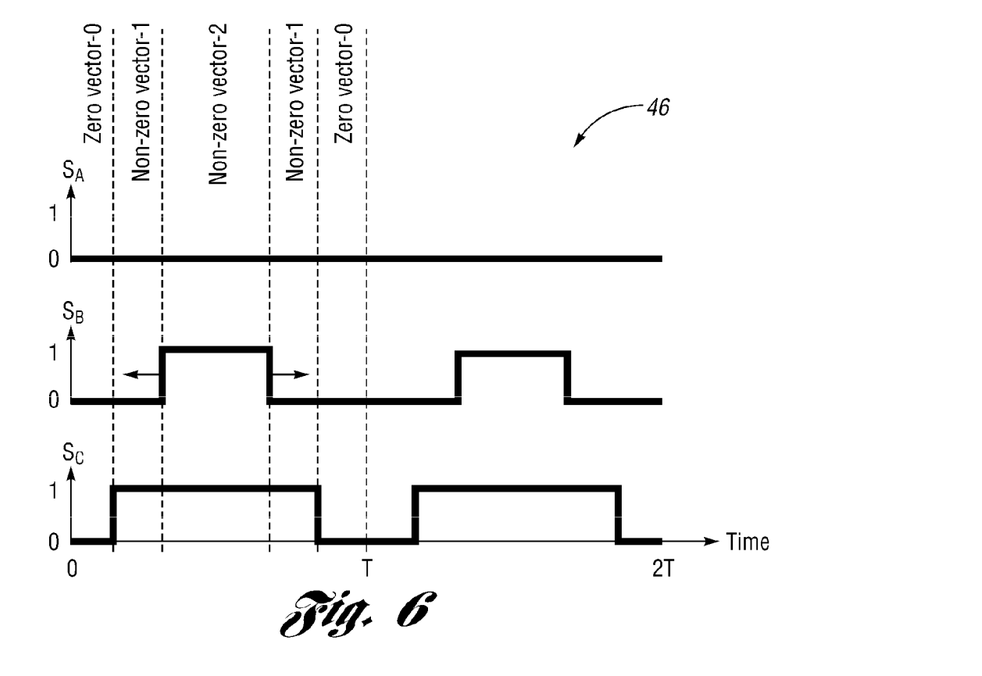
FIG. 6 is a switching diagram illustrating switching states of the first, second, and third phase legs versus time according to a discontinuous pulse width modulation (DPWM) scheme in accordance with one embodiment.

Referring to FIG. 6, a fourth switching diagram 46 is provided to illustrate switching states of the phase legs A, B, and C versus time according to a discontinuous pulse width modulation (DPWM) scheme. In DPWM, two phase legs in the converter 14 switch in a switching period T. To facilitate the following explanation, the non-switching leg is defined as the "reference phase" and the other two phase legs as "non-reference phases". Following similar strategies of the CPWM cases, the controller 30 determines whether the two "non-reference phases" are of the same current polarity when the two "non-reference phases" have the same phase state (i.e., when the "non-reference phases" are either both HIGH or both LOW).

As illustrated in FIG. 6, the fourth switching diagram 46 shows a pattern of different switching configurations of the converter 14. The pattern illustrated in the fourth switching diagram 46 includes two reactive states (labeled as "Zero vector-0" in FIG. 6) during the switching cycle T. The active states of the converter 14 during switching cycle T include <001> and <011>, which are respectively labeled "Non-zero vector-1" and "Non-zero vector-2". The controller 30 determines whether the two "non-reference phases" are of the same current polarity during "Non-zero vector-2" where the phase legs B and C are in the same phase state. If phase legs B and C have opposite current polarities during "Non-zero vector-2", then the controller 30 may determine no pattern-shifting is needed, since the ripple current flow through the DC-bus capacitor 32 may not be significantly high.

If phase legs B and C have the same current polarity during "Non-zero vector-2" (i.e., state <011> of the converter 14), the controller 30 shifts the original switching patterns of the fourth switching diagram 46 to reduce ripple current flow through the DC-bus capacitor 32. Since only two switching patterns change during the switching cycle T for the DPWM scheme, the controller 30 shifts one pattern against the other to reduce the undesired vector, which reduces the duration of the original reactive (i.e., null) vector and creates an additional active vector.

Figure 7A:
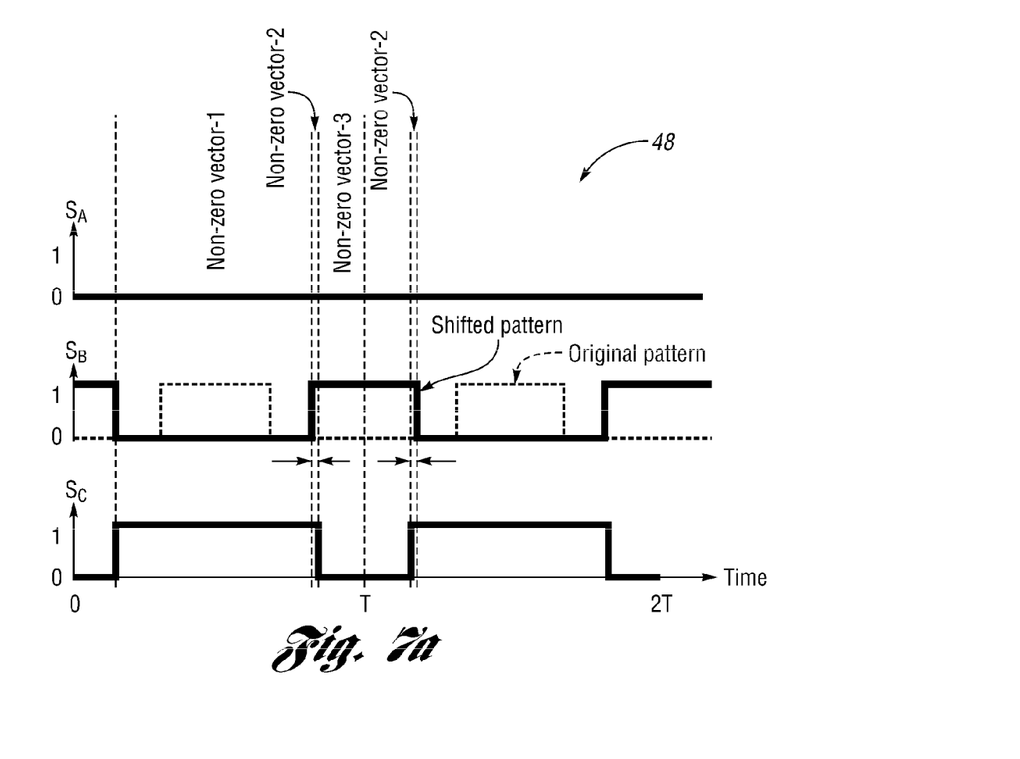
FIG. 7a is a switching diagram similar to FIG. 6, but showing switching states of phase leg B being modified relative to one of the other phase legs when the phase currents of at least two phase legs flow in the same direction in accordance with one embodiment.

Referring to FIG. 7a, a fifth switching diagram 48 is provided to show switching states of phase leg B being modified when the phase currents of two phase legs in the converter 14 flow in the same direction. The $S_B$ waveform labeled "original pattern" in the fifth switching diagram 48 corresponds to the $S_B$ waveform in the fourth switching diagram 46 of FIG. 6. In operation, the controller 30 can control the switching states of phase legs A, B, and C over the switching cycle T to shift the $S_B$ waveform labeled "original pattern" to the $S_B$ waveform labeled "shifted pattern." The controller 30 may shift the $S_B$ waveform labeled "original pattern" relative to the $S_B$ waveform labeled "shifted pattern" by an angle of about 180 degrees. The angle between the $S_B$ waveforms labeled "original pattern" and "shifted pattern" may be selected based on duration of null states in the power converter system 12. For example, the angle may vary more as the duration of null states in the power converter system 12 increases in a switching cycle T.

When the controller 30 modifies the switching states of phase leg B, the controller 30 may align, as illustrated in FIG. 7a for example, a HIGH state of phase leg B with a LOW state of phase leg C, or vice versa, to reduce the duration of null states in the power converter system 12. The fifth switching diagram 48 shows a shorter duration of null states in the power converter system 12 than the fourth switching diagram 46. Thus, the duration of null states in the power converter system 12 is reduced over a given time, such as the switching cycle T, when the controller 30 shifts the $S_B$ waveform labeled "original pattern" to the $S_B$ waveform labeled "shifted pattern" as shown in FIG. 7a. Furthermore, ripple current in the DC-bus capacitor 32 is reduced when the phase currents of two phase legs in the converter 14 flow in opposite directions.

Figure 7B:
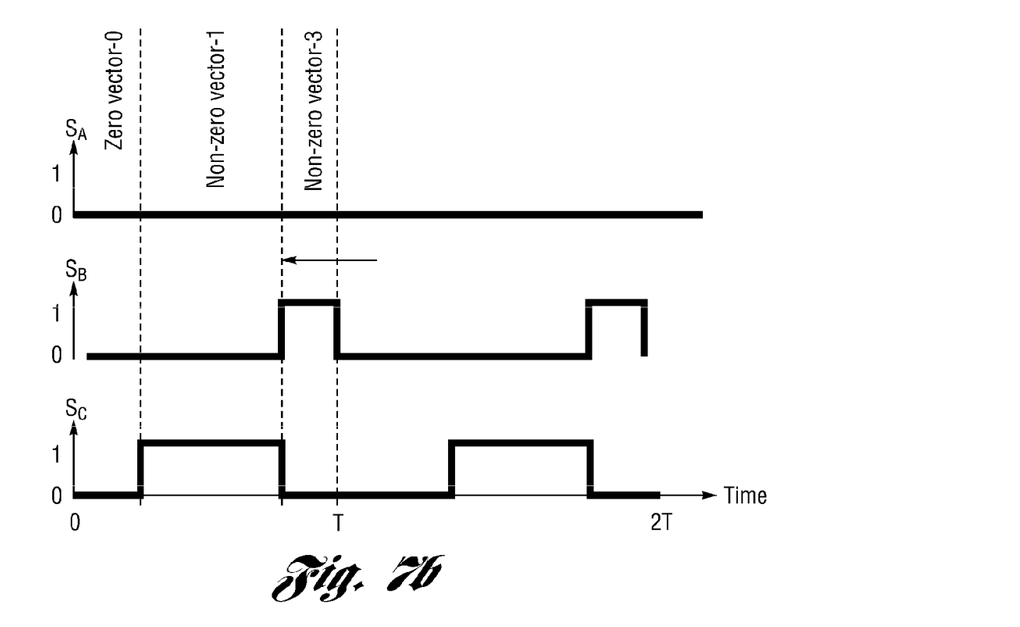
FIG. 7b is a switching diagram similar to FIG. 6, but showing a rising edge of $S_B$ waveform aligning with a falling edge of $S_C$ waveform.
Figure 7C:
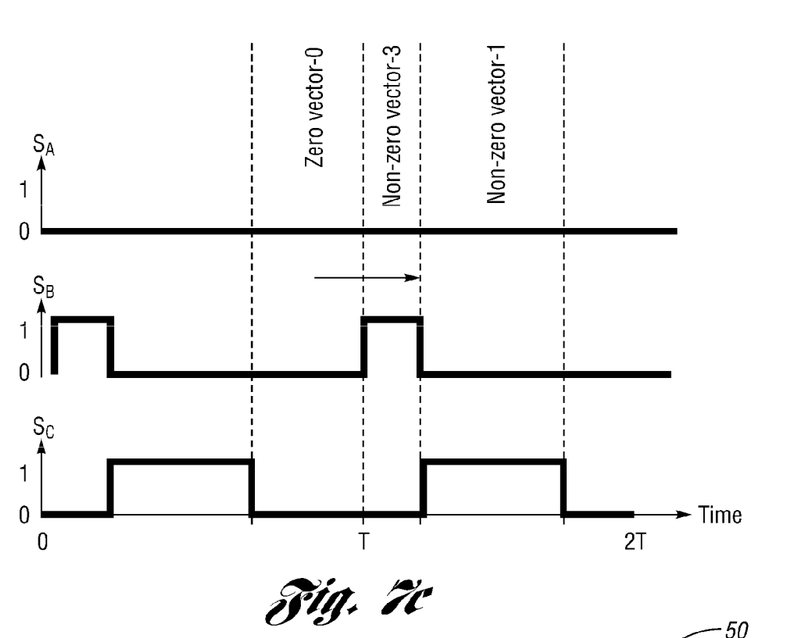
FIG. 7c is a switching diagram similar to FIG. 6, but showing a rising edge of $S_C$ waveform aligning with a falling edge of $S_B$ waveform.

With reference to FIGS. 7b-7c, the switching patterns in the fifth switching diagram 48 of FIG. 7a can be shifted within a time range while still allowing for ripple current reduction in the DC-bus capacitor 32. FIG. 7b shows switching patterns similar to the switching patterns in FIG. 7a, but with relatively short active-state durations. With relatively short active-state durations, the switching pattern can be shifted within a greater time range while still allowing for ripple current reduction in the DC-bus capacitor 32. For example, FIG. 7b shows one extreme case where a rising edge of the $S_B$ waveform aligns with a falling edge of the $S_C$ waveform. On the other hand, FIG. 7c shows another extreme case where a rising edge of the $S_C$ waveform aligns with a falling edge of the $S_B$ waveform. As long as the phase shift is between these two extremes, the ripple current can be reduced in the DC-bus capacitor 32. As the duration of null states increases in the original switching pattern, the range over which the switching patterns can be shifted while still reducing ripple current in the DC-bus capacitor 32 also increases.

Figure 8:
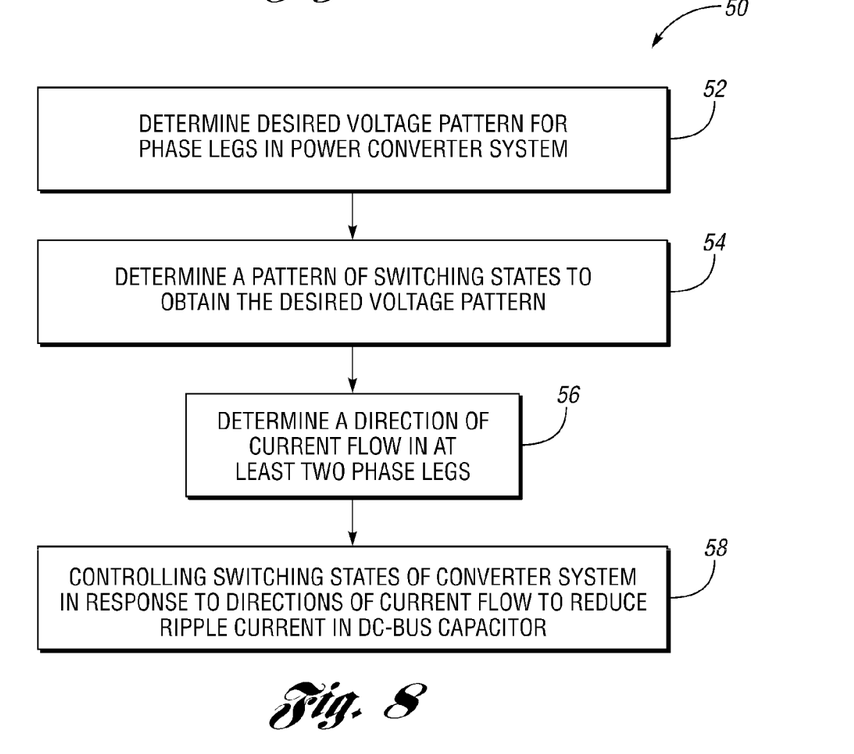
FIG. 8 is a flowchart diagram illustrating a method of controlling a power converter system, such as the power converter system of FIG. 1, in accordance with one embodiment.

With reference to FIG. 8, a flowchart diagram 50 is provided to illustrate operation of a system or method of controlling a power converter system, such as system 12. The diagram of FIG. 8 provides a representative control strategy for a power converter system as illustrated. The control strategy or logic illustrated in FIG. 8 may be implemented by one or more logic arrays and/or a microprocessor based computer or controller. When implemented by a microprocessor based controller, the control strategy may include instructions or code processed using any of a number of known strategies such as event-driven, interrupt-driven, multi-tasking, multi-threading, and the like. Whether implemented primarily in code or hardware devices, various steps or functions illustrated may be performed in the sequence illustrated, in parallel, or in some cases omitted. Although not explicitly illustrated, one of ordinary skill in the art will recognize that one or more of the illustrated functions may be repeatedly performed depending upon the particular implementation. Similarly, the order of processing is not necessarily required to achieve the described features and advantages, but is provided for ease of illustration and description.

Of course, the control logic may be implemented in software, hardware, or a combination of software and hardware in one or more controllers and/or electronic devices depending upon the particular application. When implemented in software, the control logic is preferably provided in one or more computer-readable storage media having stored data representing code or instructions executed by a computer to control the engine. The computer-readable storage media may include one or more of a number of known physical devices which utilize electric, magnetic, optical, and/or hybrid storage to keep executable instructions and associated calibration information, operating variables, and the like.

At block 52 of flowchart diagram 50, a desired voltage pattern is determined for the phase legs 16, 18, 20 in the power converter system 12. The controller 30 can determine the desired voltage pattern depending on how the controller 30 is commanded to convert power between the DC power link 22 and the AC machine 26. For example, the desired voltage pattern for the power converter system 12 may be determined to operate the power converter system 12 as a DC-to-AC converter that drives the AC machine 26. The desired voltage pattern may be varied based on how the controller 30 is commanded to drive the AC machine 26. In another example, the desired voltage pattern may be determined to operate the power converter system 12 as an AC-to-DC converter.

At block 54, a pattern of switching states is determined to obtain the desired voltage pattern. The controller 30 can determine the pattern of switching states of the phase legs 16, 18, 20 to obtain the desired voltage pattern across the phase legs 16, 18, 20. For example, if the voltage of the DC bus 24 is $V_{dc}$ and the desired output voltages of phase legs 16, 18, and 20 are $V_a$, $V_b$, and $V_c$ with respect to the negative rail of the DC bus 24, then the required time durations of HIGH state in one switching period may be $V_a/V_{dc}*T$, $V_b/V_{dc}*T$, and $V_c/V_{dc}*T$, respectively.

At block 56, a direction of current flow is determined in at least two of the phase legs 16, 18, 20. Current sensors $CS_a$, $CS_b$, and $CS_c$ shown in FIG. 1 can sense current flow in the respective phase legs 16, 18, 20 and provide respective feedback signals $i_{as}$, $i_{bs}$, and $i_{cs}$ (also illustrated in FIG. 1) embedded or encoded with the direction of current flow in the phase legs 16, 18, 20. The controller 30 can receive the feedback signals $i_{as}$, $i_{bs}$, and $i_{cs}$ to determine the direction of current flow in at least two of the phase legs 16, 18, 20. The controller 30 may determine the direction of current flow in the two phase legs relative to the DC bus capacitor 32 for directional reference for the system 10.

At block 58 of flowchart diagram 50, switching states of the power converter system 12 are controlled in response to the directions of current flow to reduce ripple current in the DC-bus capacitor 32. The controller 30 controls the switching states of the power converter system 12 by transmitting the control signal 36 to the power converter system 12. Based on the control signal 36, the switching state of each power switch 28 in the converter 14 is controlled to be in a state of either ON or OFF. Based on the ON and OFF states of the power switches 28, HIGH and/or LOW states of the phase legs 16, 18, 20 are generated, and a switching configuration of the converter 14 is obtained. The controller 30 controls the switching configurations of the converter 14 over time to reduce ripple current in the DC-bus capacitor 32. In operation, the controller 30 can modify the switching states of one or more of the phase legs 16, 18, 20 relative to at least one other phase leg in the converter system 12 to reduce duration of null states in the converter system 12 when two currents associated with two of the non-reference phase legs 16, 18, 20 flow in the same direction. When the non-reference phase currents flow in opposite directions and the controller 30 reduces the duration of null states in the converter system 12, such as in the three-phase converter examples of FIGS. 4-5 and 7a-7c, ripple current in the DC-bus capacitor 32 is reduced.

In the three-phase converter example in FIG. 4, the controller 30 may control the switching states of phase leg A over the switching cycle T to shift the $S_A$ waveform labeled "original pattern" to the $S_A$ waveform labeled "shifted pattern" (shown in FIG. 4) when non-reference phase currents (i.e., phase currents $i_a$ and $i_b$, phase currents $i_b$ and $i_c$, or phase currents $i_a$ and $i_c$) flow in the same direction.

In the three-phase converter example in FIG. 5, the controller 30 may control the switching states of phase legs A and B over the switching cycle T to shift the $S_A$ and $S_B$ waveforms labeled "original patterns" to the $S_A$ and $S_B$ waveforms labeled "shifted patterns" (shown in FIG. 5) when non-reference phase currents (i.e., phase currents $i_a$ and $i_b$, phase currents $i_b$ and $i_c$, or phase currents $i_a$ and $i_c$) flow in the same direction.

In the three-phase converter example in FIG. 7a, the controller 30 may control the switching states of phase leg B over the switching cycle T to shift the $S_B$ waveform labeled "original pattern" to the $S_B$ waveform labeled "shifted pattern" (shown in FIG. 7a) when non-reference phase currents (i.e., phase currents $i_a$ and $i_b$, phase currents $i_b$ and $i_c$, or phase currents $i_a$ and $i_c$) flow in the same direction.

As described above, various embodiments according to the present disclosure control the switching states of the power converter system in response to the directions of current flow to reduce ripple current in the DC-bus capacitor, which may facilitate use of a smaller and generally less-expensive capacitor for a particular application.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention. While various embodiments may have been described as providing advantages or being preferred over other embodiments with respect to one or more desired characteristics, as one skilled in the art is aware, one or more characteristics may be compromised to achieve desired system attributes, which depend on the specific application and implementation. These attributes include, but are not limited to: cost, strength, durability, life cycle cost, marketability, appearance, packaging, size, serviceability, weight, manufacturability, ease of assembly, etc. The embodiments described herein as less desirable than other embodiments or prior art implementations with respect to one or more characteristics are not outside the scope of the disclosure and may be desirable for particular applications.

What is claimed is:

1. A method of controlling a power converter system with first, second, and third phase legs with respective first, second, and third associated phase currents, the legs being connected to a DC-bus capacitor, the method comprising:
determining a direction of current flow in at least two of the phase legs for a switching cycle; and
controlling switching states of the power converter system for the switching cycle in response to the directions of current flow determined for the switching cycle;
wherein controlling the switching states changes relative timing of current flow between the two of the phase legs with the relative timing of current flow changing during the switching cycle thereby reducing ripple current in the DC-bus capacitor.

2. The method of claim 1 wherein controlling the switching states includes modifying the switching states of one of the phase legs relative to at least one other phase leg in the converter system to reduce duration of null states in the converter system when associated non-reference phase currents flow in a same direction.

3. The method of claim 2 further including designating a reference phase leg in the converter system to be the first phase leg and the non-reference phase currents as the second and third associated phase currents.

4. The method of claim 2 wherein modifying the switching states includes aligning a HIGH state of the second phase leg with a LOW state of the third phase leg, the second and third phase legs being non-reference phase legs.

5. The method of claim 2 wherein modifying the switching states includes selecting an alternative state in the converter system that is adjacent to an undesired state in the converter system, wherein current flow in non-referenced phases flows in the opposite directions during the alternative state.

6. The method of claim 2 wherein modifying the switching states includes aligning a LOW state of the second phase leg with a HIGH state of the third phase leg, the second and third phase legs being non-reference phase legs.

7. The method of claim 6 wherein modifying the switching states includes selecting an alternative state in the converter system that is adjacent to an undesired state in the converter system, wherein current flow in non-referenced phases flows in the opposite directions during the alternative state.

8. The method of claim 2 wherein controlling the switching states includes applying a discontinuous pulse width modulated (DPWM) switching signal to the phase legs and modifying the DPWM switching signal to modify the switching states of the one phase leg relative to the other phase leg.

9. The method of claim 2 wherein modifying the switching states includes phase shifting the second phase leg relative to the third phase leg at an angle about 180 degrees, the angle being based on duration of null states in the power converter system.

10. The method of claim 9 wherein a reference phase leg in the converter system is the first phase leg and the second and third associated phase currents are the non-reference phase currents.

11. The method of claim 1 wherein controlling the switching states includes modifying the switching states of at least two of the phase legs relative to at least one other phase leg in the converter system when the phase currents of the two phase legs flow in the same direction to reduce duration of null states in the converter system.

12. The method of claim 11 wherein modifying the switching states of the two phase legs relative to the other phase leg includes phase shifting the two phase legs relative to the other phase leg as well as the two phase legs relative to each other.

13. The method of claim 11 wherein modifying the switching states includes overlapping a HIGH state of at least one of the two phase legs with a LOW state of the other phase leg to reduce the duration of nulls states in the converter system thereby reducing ripple current in the DC-bus capacitor.

14. The method of claim 11 wherein modifying the switching states includes overlapping a LOW state of at least one of the two phase legs with a HIGH state of the other phase leg to reduce the duration of nulls states in the converter system thereby reducing ripple current in the DC-bus capacitor.

15. The method of claim 11 wherein controlling the switching states includes applying a continuous pulse width modulated (CPWM) switching signal to the phase legs and modifying the CPWM switching signal to modify the switching states of the two phase legs relative to the other phase leg.

16. The method of claim 11 further comprising modifying the switching states of the two phase legs to align switching of a first of the two phase legs from HIGH to LOW states with switching of the other phase leg from HIGH to LOW states and to align switching of a second of the two phase legs from HIGH to LOW states with switching of the other phase leg from LOW to HIGH states.

17. A system for controlling a power converter unit with first, second, and third phase legs with respective first, second, and third associated phase currents, the legs being connected to a direct current (DC)-bus capacitor, the system comprising:
 at least one logic device configured to determine a direction of current flow in at least two of the phase legs for a switching cycle and to control switching states of the power converter unit for the switching cycle in response to the directions of current flow determined for the switching cycle, wherein controlling the switching states changes relative timing of current flow between the two of the phase legs with the relative timing of current flow changing during the switching cycle thereby reducing ripple current in the DC-bus capacitor.

18. The system of claim 17 wherein the logic device is a controller including a processor operable to execute software instructions, a computer memory operable to store software instructions accessible by the processor, and a set of software instructions stored in the memory to determine the direction of current flow in the two phase legs and to control the switching states of the power converter unit.

19. At least one logic storage medium having logic-device-readable code embodied thereon for performing a method of controlling a power converter system with first, second, and third phase legs with respective first, second, and third associated phase currents, the legs being connected to a direct current (DC)-bus capacitor, the method comprising:
 determining a direction of current flow in at least two of the phase legs for a switching cycle; and
 controlling switching states of the power converter system for the switching cycle in response to the directions of current flow determined for the switching cycle;
 wherein controlling the switching states changes relative timing of current flow between the two of the phase legs with the relative timing of current flow changing during the switching cycle thereby reducing ripple current in the DC-bus capacitor.

20. The storage medium of claim 19 wherein controlling the switching states includes modifying the switching states of one of the phase legs relative to at least one other phase leg in the converter system to reduce duration of null states in the converter system when associated non-reference phase currents flow in a same direction.

* * * * *